United States Patent
Vogt

(10) Patent No.: US 12,123,259 B2
(45) Date of Patent: Oct. 22, 2024

(54) COMBINATION HUNTING STAND AND CART

(71) Applicant: Mark Edward Vogt, North Aurora, IL (US)

(72) Inventor: Mark Edward Vogt, North Aurora, IL (US)

( * ) Notice: Subject to any disclaimer, the term of this patent is extended or adjusted under 35 U.S.C. 154(b) by 193 days.

(21) Appl. No.: 17/092,276

(22) Filed: Nov. 8, 2020

(65) Prior Publication Data
US 2022/0145699 A1 May 12, 2022

(51) Int. Cl.
| | | |
|---|---|---|
| *E06C 1/34* | (2006.01) | |
| *A01M 31/02* | (2006.01) | |
| *E06C 1/39* | (2006.01) | |
| *E06C 1/397* | (2006.01) | |

(52) U.S. Cl.
CPC .............. *E06C 1/34* (2013.01); *A01M 31/02* (2013.01); *E06C 1/39* (2013.01); *E06C 1/397* (2013.01)

(58) Field of Classification Search
CPC ....... A01M 31/02; A01M 31/006; E06C 1/34; E06C 1/39; E06C 1/397
See application file for complete search history.

(56) References Cited

U.S. PATENT DOCUMENTS

| | | | | |
|---|---|---|---|---|
| 5,314,042 A | * | 5/1994 | Adams | A01M 31/02 182/20 |
| 5,566,780 A | * | 10/1996 | Bambrough | E06C 1/34 182/20 |
| 5,839,538 A | * | 11/1998 | Magyar | E06C 1/393 182/20 |
| 6,516,918 B2 | * | 2/2003 | Hess | E06C 7/42 182/20 |
| 8,579,082 B1 | * | 11/2013 | Owens | E06C 1/397 182/127 |
| 9,038,778 B1 | * | 5/2015 | Carter | E06C 7/423 182/20 |
| 10,136,634 B2 | * | 11/2018 | Matthews | A01M 31/02 |
| 2002/0036116 A1 | * | 3/2002 | Hess | E06C 1/10 182/20 |
| 2007/0199768 A1 | * | 8/2007 | Duke | E06C 1/39 182/21 |
| 2014/0014797 A1 | * | 1/2014 | McSherry | F16B 2/12 248/231.41 |
| 2015/0211298 A1 | * | 7/2015 | Rogers | E06C 1/383 182/21 |
| 2015/0361722 A1 | * | 12/2015 | Chick | E06C 7/188 182/116 |
| 2017/0318799 A1 | * | 11/2017 | Stilwell | B62B 1/262 |
| 2018/0139951 A1 | * | 5/2018 | Matthews | A01M 31/02 |

* cited by examiner

*Primary Examiner* — Rodney Mintz

(57) ABSTRACT

Herein disclosed is a platform apparatus which attaches to the top of a conventional ladder or extension ladder, and a wheeled apparatus which attaches to said ladder, thus forming a single composite apparatus. Said composite apparatus can then operate as a cart for transporting itself, equipment and other loads to and from usage locations, and said composite apparatus can operate as an elevated platform when attached to a tree or similar elevated surface.

1 Claim, 7 Drawing Sheets

COMBINATION HUNTING STAND AND CART

CROSS-REFERENCE TO RELATED INVENTIONS

Not Applicable

STATEMENT REGARDING FEDERALLY SPONSORED RESEARCH

Not Applicable

NAMES OF THE PARTIES TO A JOINT RESEARCH AGREEMENT

Not Applicable

REFERENCE TO SEQUENCE LISTING, A TABLE OR COMPUTER PROGRAM LISTING USING COMPACT DISC APPENDIX

Not Applicable

STATEMENT REGARDING PRIOR DISCLOSURE BY THE INVENTOR OR A JOINT INVENTOR

Not Applicable

BACKGROUND OF THE INVENTION

Challenges common to hunting include the need to hunt from varying elevated positions, and the need to transport equipment and carcasses. While solutions incorporating platforms, ladders and wheels have already been proposed and patented, deficiencies still exist in these solutions, due to only partially addressing all the criteria for a solution to be effective and marketable.

These additional criteria include but are not limited to the following:
- attaches to an extension ladder;
- adapts to ladders of varying shapes and dimensions;
- operates silently;
- adapts to wheels of varying types and diameters;
- positions cartwheels wide enough to permit climbing said ladder;
- easily adjusts the position of wheels along the length of said ladder;
- switches easily from cart to stand to cart again;
- attaches to a variety of elevated surfaces like trees, poles and walls;
- attaches to a variety of tree types-straight or crooked, smooth or branched;
- attaches safely and securely to a range of diameters of tree (or pole);
- disassembles easily, so the incorporated ladder could be used normally;
- preserves the incorporated ladder's structural integrity;
- designed for economical fabrication.

A solution meeting all the above criteria would both differentiate itself from all prior art while also being cost-effective to fabricate and easy to use.

No current prior art meets all the above criteria.

The present invention does meet all the above criteria, and in so doing differentiates itself from all prior art.

- The present invention can be attached to a 2-piece or even 3-piece extension ladder;
- The present invention possesses adjustable attachment apparatuses enabling it to be attached to a wide variety of ladder shapes and dimensions;
- The present invention attaches firmly to its incorporated ladder and utilizes wheels and axles with zero free play. These ensure silent operation;
- The present invention uses side-mounted axles which enable a wide variety of wheels diameters to be attached;
- The present invention uses side-mounted axles and wheels which create a gap between the wheels sufficient to enable a wide range of operator sizes to readily climb the incorporated ladder;
- The present invention permits the attachment of wheels anywhere along the length of the incorporate ladder, to within 6 inches of either end of said ladder;
- The present invention easily switches from cart to stand to cart again swiftly;
- The present invention can be attached to a variety of trees, poles and walls;
- The present invention can be attached securely to a range of diameters of tree or poles;
- The present invention readily disassembles swiftly, enabling the attached ladder or extension ladder to continue to be used for additional non-hunting purposes;
- The present invention attaches to the attached ladder using only fasteners and attachment points which preserve said ladder's structural integrity;
- The present invention is designed for simple economical fabrication.

BRIEF SUMMARY OF THE INVENTION

The present invention is a pair of apparatuses: a platform apparatus capable of being attached to a ladder; and a wheel apparatus also capable of being attached to said ladder. The resulting assembly comprised of said platform apparatus, said ladder and said wheel apparatus can then be operated as both a hand cart and an elevated platform or stand.

The numerical references used in the figures are:
1 Ladder
2 Platform Apparatus
3 Wheel/Transportation Apparatus
4 Handle
5 Platform Frame
6 First Ladder Attachment Leg
7 Second Ladder Attachment Leg
8 Wheel
9 Ladder Attachment Bracket
10 Axle
11 Telescoping Frame Member

DETAILED DESCRIPTION OF THE INVENTION

Figure 1:
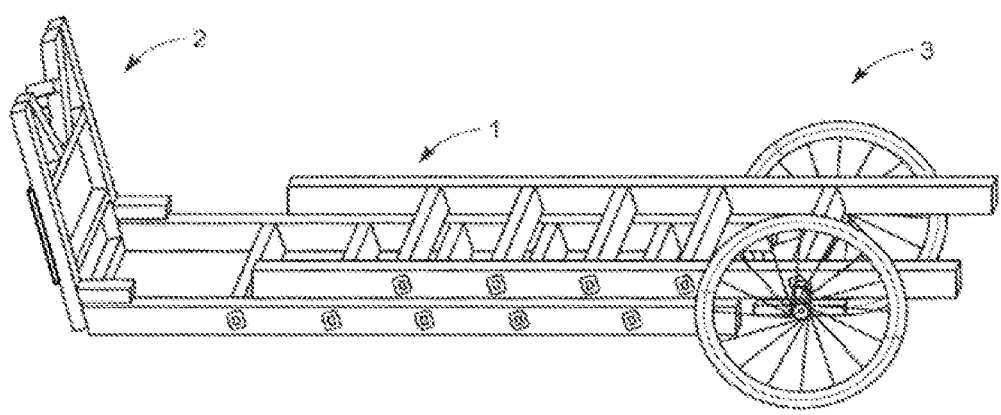
FIG. 1 is a perspective view of an embodiment of the present invention attached to a ladder operated as a hand cart.

In one embodiment, the present invention is comprised of Platform Apparatus 2 and a Wheel Apparatus 3 fabricated from aluminum tubing and aluminum plates welded together and attached to a Ladder 1 as shown in FIG. 1.

FIG. 1 shows the present invention attached to a Ladder 1, enabling said ladder attached to the present invention to be operated as a hand cart.

Figure 2:
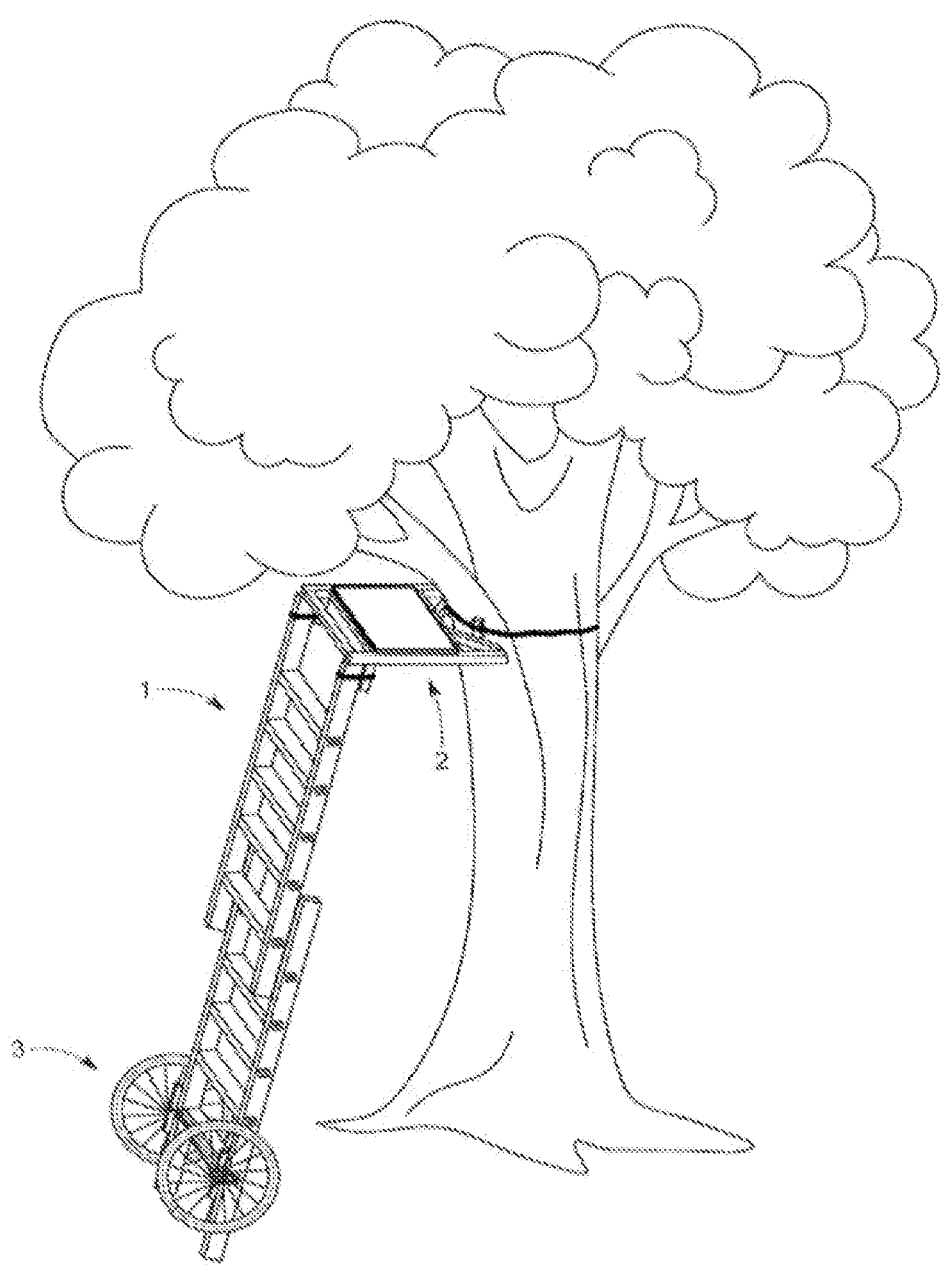
FIG. 2 is a perspective view of an embodiment of the present invention attached to a ladder operated as an elevated platform.

FIG. 2 shows the present invention attached to said Ladder 1, enabling said ladder connected to the present invention to be operated as an elevated platform. The present invention is positioned so that the Platform Apparatus 2 is attached securely to a surface in a tree, a pole, a wall or similar elevated location.

Figure 3:
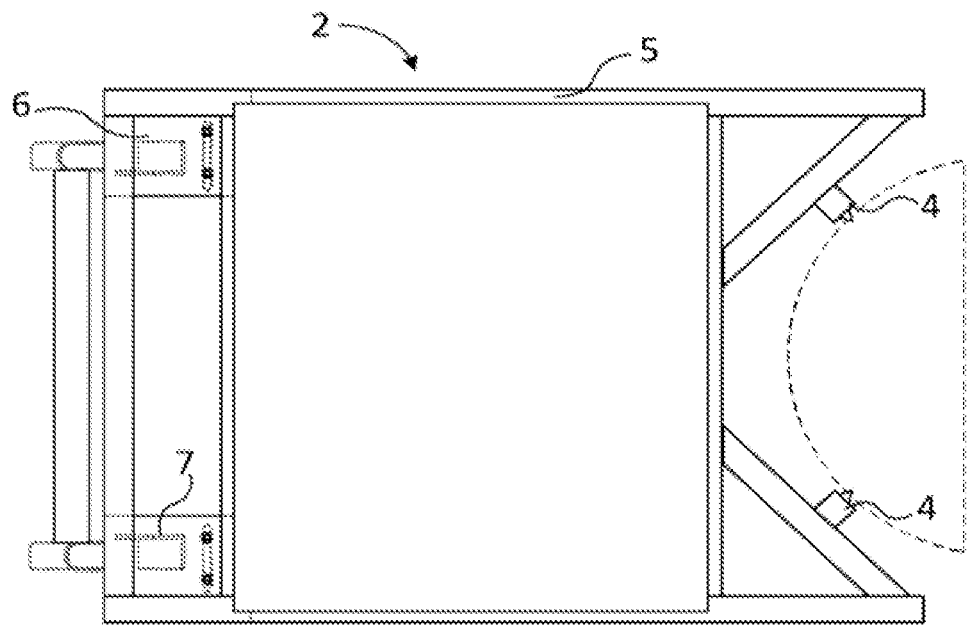
FIG. 3 is a top view of the platform apparatus.

FIG. 3 shows Platform Apparatus 2. Platform Apparatus Frame 5 is formed from welded aluminum tubing and aluminum plate. To the side of Platform Apparatus Frame 5 which contacts an elevated surface is attached a plurality of Platform Apparatus Handle 4. To the side of Platform Apparatus 5 which contacts said ladder is attached a plurality of Ladder Attachment Upper Bracket 6. To each Ladder Attachment Upper Bracket 6 is attached a Ladder Attachment Lower Bracket 7 in such a way that said plates can shift position relative to each other, enabling the Platform Apparatus 2 to be attached to ladders of varying dimensions. Platform Apparatus 2 is attached to Ladder 1 using said plurality of Ladder Attachment Lower Bracket 7.

Figure 4:
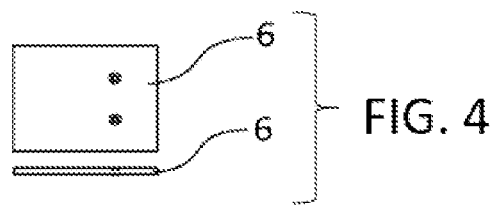
FIG. 4 is another view of the platform apparatus.

FIG. 4 shows Ladder Attachment Upper Bracket 6 separately before being attached to Platform Apparatus Frame 5.

Figure 5:
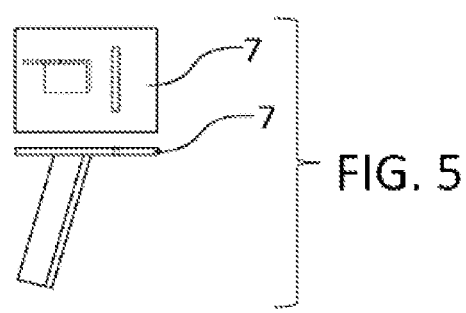
FIG. 5 is another view of the platform apparatus.

FIG. 5 shows Ladder Attachment Lower Bracket 7 separately before being attached to Platform Apparatus Frame 5.

Figure 6:
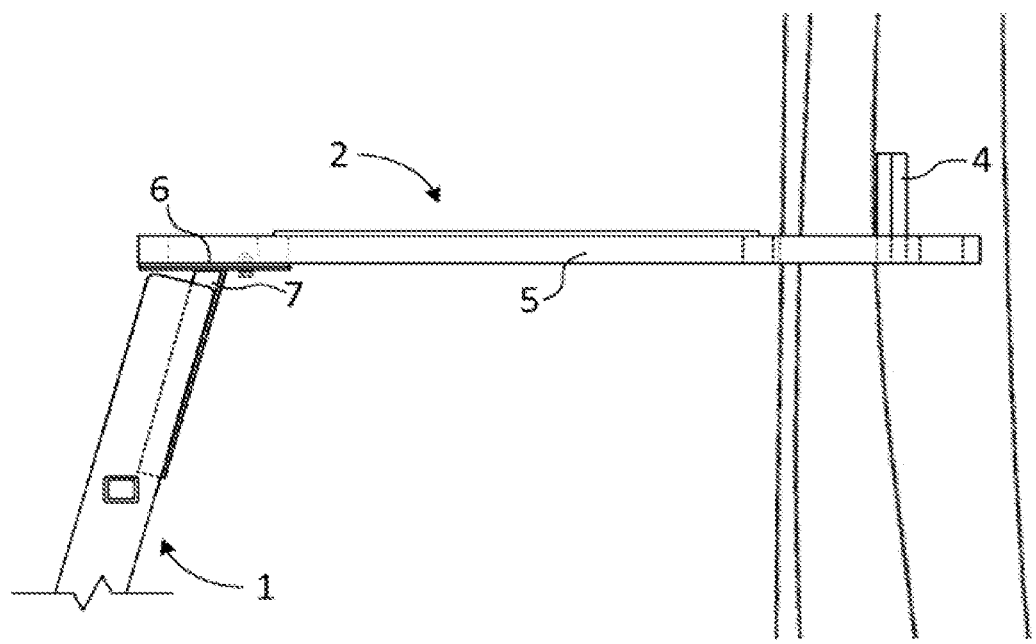
FIG. 6 is a side view of the tree attachment mechanism of the platform apparatus engaging a tree.

FIG. 6 shows a detail of Platform Apparatus 2 in operation as an elevated platform. Ladder Attachment Upper Bracket 6 is attached near the side of Platform Apparatus Frame 5 contacting said ladder. Ladder Attachment Lower Bracket 7 is attached to Ladder Attachment Upper Bracket 6. Ladder 1 is attached to Ladder Attachment Lower Bracket 7. A plurality of Platform Apparatus Handle 4 is attached to said elevated surface.

Figure 7:
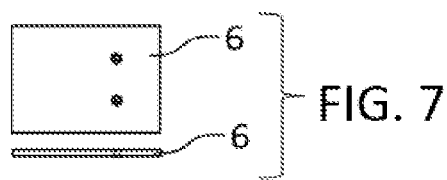
FIG. 7 is another view of the platform apparatus.

FIG. 7 shows Ladder Attachment Upper Bracket 6 separately before being attached to Platform Apparatus Frame 5.

Figure 8:
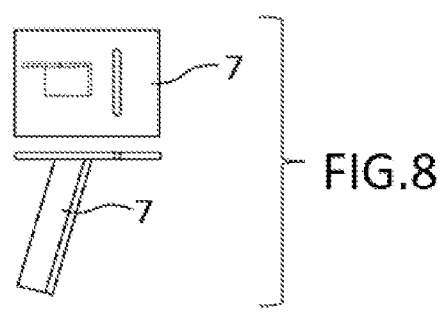
FIG. 8 is another view of the platform apparatus.

FIG. 8 shows Ladder Attachment Lower Bracket 7 separately before being attached to Platform Apparatus Frame 5.

Figure 9:
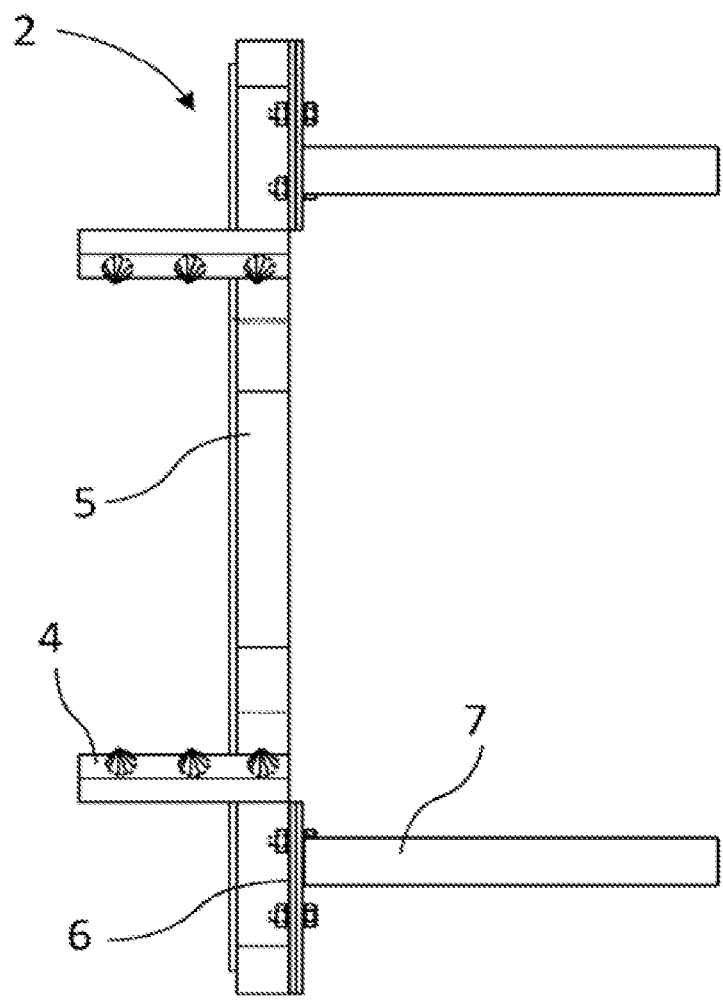
FIG. 9 is another view of the platform apparatus.

FIG. 9 shows a rear view of Platform Apparatus 2 more clearly illustrating the plurality of Platform Apparatus Handle 4 and plurality of Ladder Attachment Lower Bracket 7.

Figure 10:
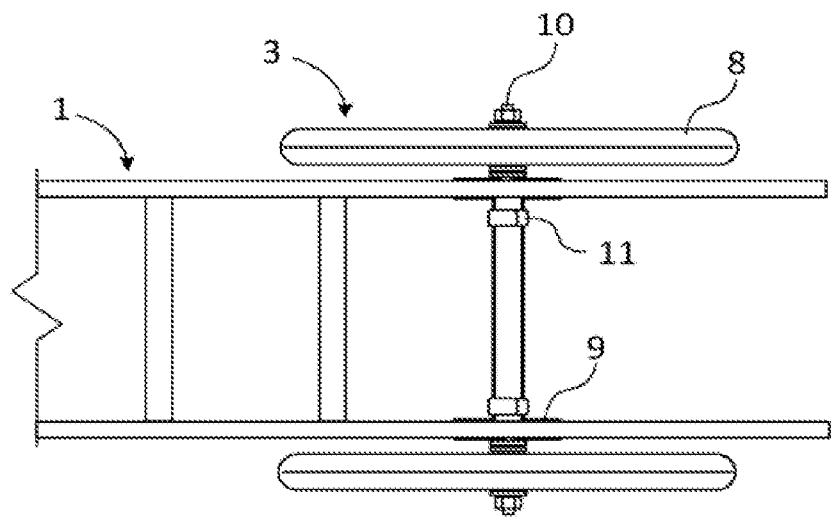
FIG. 10 is a view of the transportation apparatus.

FIG. 10 shows an overhead view of said Wheel Apparatus 2. Said apparatus is fabricated from aluminum structural bar stock welded to aluminum structural angle extrusions to form a Ladder Attachment Bracket 9 to which is attached a plurality of Wheel Apparatus Axle 10. To said Wheel Apparatus 3 is attached a plurality of Wheel Apparatus Wheel 8. Wheel Apparatus 3 is then attached to said Ladder 1 using Ladder Attachment Mechanism 11 in such a way that Ladder 1 can now be operated as a hand cart as shown in FIG. 1.

Figure 11:
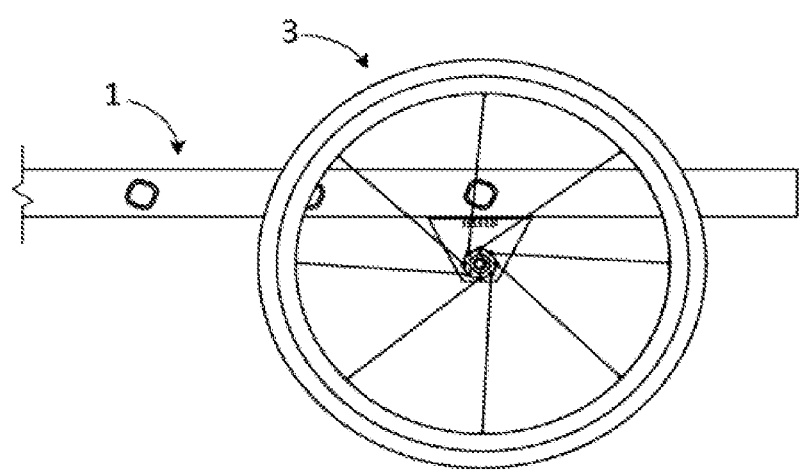
FIG. 11 is another view of the transportation apparatus.

FIG. 11 shows a side view of said Wheel Apparatus 2.

The present invention can then be used as an elevated platform by positioning said ladder in contact with said elevated surface, as shown in FIG. 2. If said ladder is capable of extending, additional elevation of the Platform Apparatus 2 can be achieved by extending Ladder 1, then positioning said ladder in contact with said elevated surface.

Figure 12:
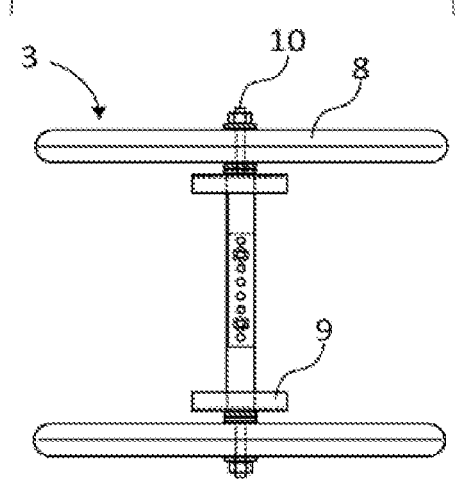
FIG. 12 is a top view of the ladder attachment structure of the transportation apparatus.
Figure 13:
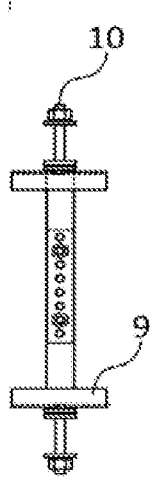
FIG. 13 is another view of the ladder attachment structure of the transportation apparatus.
Figure 14:
FIG. 14 is another view of the ladder attachment structure of the transportation apparatus.
Figure 15:
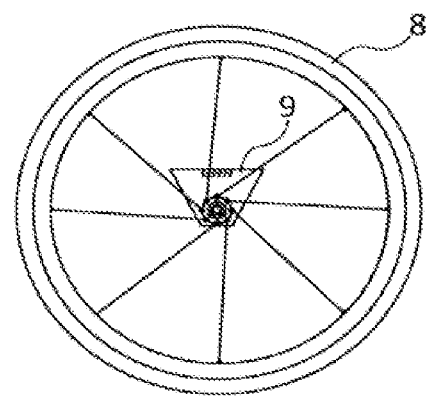
FIG. 15 is another view of the ladder attachment structure of the transportation apparatus.
Figure 16:
FIG. 16 is another view of the ladder attachment structure of the transportation apparatus.

FIGS. 12, 13 and 14 show detailed overhead and side views of said Wheel Apparatus 3 with said ladder not displayed. Ladder Attachment Bracket 9 can be clearly seen connected to a plurality of Wheel Apparatus Wheel 8 and a plurality of Wheel Apparatus Axle 10. Note that Ladder Attachment Bracket 9 can be adjusted to attach to ladders of varying dimensions.

In another embodiment the present invention could be fabricated from steel or other metal tubing, steel or other structural angle metal, wood or plastic or composites.

In another embodiment the present invention could be fabricated from molded plastic.

In another embodiment the present invention could be fabricated with a plurality of more than two wheels that could be attached to Ladder 1.

In another embodiment the present invention could be fabricated with non-rigid folding joints so that both the Platform Apparatus 2 and the Wheel Apparatus 3 could be made to fold or otherwise collapse for ease of storage and ease of shipment.

In another embodiment the present invention could include a plurality of apparatus attached to Platform Apparatus 2 to be used for storage.

In the working prototype, the material used is welded steel structural tubing, structural plate, structural bar stock and structural angle extrusions.

In the best mode, the present invention is fabricated by welding aluminum structural tubing, structural plate and aluminum structural bar stock to form a rigid Platform Apparatus 2, and welding aluminum structural bar stock and aluminum structural angle extrusions and attaching axles and wheels to form Wheel Apparatus 3.

SEQUENCE LISTING

Not Applicable

I claim:

1. A system configured for use as both a hunting stand and a cart, the system consisting of:
   a ladder having upper and lower ends;
   a platform apparatus removably attached to the upper end of said ladder, the platform apparatus having a platform structure defined by an outer peripheral frame and at least two horizontal reinforcing members welded inside the outer peripheral frame, and a square plate coextensively positioned on a top surface of the platform structure, the square plate configured to serve as a platform for the hunting stand, wherein two adjustable ladder attachment legs are located at a first end of the platform apparatus, the two adjustable ladder attachment legs extending below the platform structure at an angle that matches an angle of the ladder, the two adjustable ladder attachment legs being removably attached to the upper end of the ladder, wherein a tree attachment mechanism is located at an opposing second end of the platform apparatus, the tree attachment mechanism consists of a V-shaped receptacle configured to be attached to an elevated structure, the V-shaped receptacle having a plurality of handles positioned therearound, wherein the platform structure is composed of welded aluminum tubing and the square plate is composed of an aluminum plate material; and a transportation apparatus removably attached to the lower end of said ladder, the transportation apparatus having a ladder attachment structure removably attached to the lower end of the ladder, the ladder attachment structure defined by a telescoping, adjustable frame member composed of welded aluminum tubing that is laterally offset from two, opposed flanged distal ends each having an outer surface and an inner surface, each flanged distal end consists of an axle projecting from said outer surface having a respective wheel positioned thereon and an adjustable ladder attachment bracket positioned on said inner surface, the transportation apparatus configured to allow for transportation of the ladder while also functioning as the cart.

* * * * *